United States Patent
Okanoue

(10) Patent No.: US 6,415,330 B1
(45) Date of Patent: Jul. 2, 2002

(54) METHOD OF SETTING UP AD HOC LOCAL AREA NETWORK, METHOD OF COMMUNICATING USING SAID NETWORK, AND TERMINAL FOR USE WITH SAID NETWORK

(75) Inventor: Kazuhiro Okanoue, Tokyo (JP)

(73) Assignee: Nec Corporation, Tokyo (JP)

( * ) Notice: Subject to any disclaimer, the term of this patent is extended or adjusted under 35 U.S.C. 154(b) by 0 days.

(21) Appl. No.: 09/559,994

(22) Filed: Apr. 27, 2000

Related U.S. Application Data

(62) Division of application No. 03/993,652, filed on Dec. 18, 1997.

(30) Foreign Application Priority Data

Dec. 27, 1996 (JP) .............................................. 8-358695

(51) Int. Cl.[7] .............................................. G06F 15/16
(52) U.S. Cl. ...................... 709/245; 709/228; 709/222
(58) Field of Search ................................ 709/228, 222, 709/250, 227, 245; 455/63, 422, 552, 557; 370/337, 329, 349, 338, 311; 345/339, 326, 329

(56) References Cited

U.S. PATENT DOCUMENTS

| | | | |
|---|---|---|---|
| 5,252,979 A | 10/1993 | Nysen | |
| 5,412,654 A | 5/1995 | Perkins | |
| 5,436,905 A | 7/1995 | Li et al. | |

(List continued on next page.)

FOREIGN PATENT DOCUMENTS

| | | |
|---|---|---|
| JP | H7-303105 | 1/1995 |
| JP | H7-212814 | 8/1995 |
| JP | H8-327627 | 6/1996 |
| JP | H9-83536 | 3/1997 |
| JP | H9-252319 | 9/1997 |
| JP | H8-195091 | 2/1998 |
| JP | H10-93555 | 4/1998 |

OTHER PUBLICATIONS

Johnson et al, Protocols for Adaptive Wireless and MObile Networking IEEE Feb. 1996.*

Johnson, Rouint in Ad Hoc Networks of Mobile Hosts .IEEE Jun. 1995.*

David B. Johnson, "Routing in Ad Hoc Networks of Mobile Hosts", Proceedings of the IEEE Workshop on Mobile Computing Systems and Applications, Dec. 1994, pp. 1–6.

Vinay Kumar, *Mbone: Interactive Multimedia on the Internent*, New Riders Publishing, 1996, pp. 20–23.

Radia Perlman, *Interconnections:B Bridges and Routers*, Addison–Wesley Publishing Co., Inc. 1992, pp. 127–133.

(List continued on next page.)

*Primary Examiner*—Mehmet B. Geckil
*Assistant Examiner*—Thong Vu
(74) *Attorney, Agent, or Firm*—Sughrue Mion, PLLC

(57) ABSTRACT

An ad hoc LAN is set up in an environment in which there simultaneously exist a backbone-connected LAN connected by a high-speed backbone network and an ad hoc LAN not connected to the backbone network, wherein the ad hoc LAN is capable of communicating simultaneously with both LANs. An ad hoc LAN is defined as one multicast group used within the backbone network and backbone-connected LAN. This makes it possible for a terminal, which is connected to the ad hoc LAN and backbone-connected LAN simultaneously so that it may communicate with both LANs, to participate in the ad hoc LAN in the same manner as it would participate in a multicast group of a conventional backbone-connected LAN. As a result, the terminal construction is simplified and the terminal can be connected to an ad hoc LAN and backbone-connected LAN simultaneously.

5 Claims, 14 Drawing Sheets

U.S. PATENT DOCUMENTS

| | | | |
|---|---|---|---|
| 5,572,528 A | | 11/1996 | Shuen |
| 5,623,495 A | | 4/1997 | Eng et al. |
| 5,652,751 A | | 7/1997 | Sharony |
| 5,696,903 A | * | 12/1997 | Mahany ............... 709/228 |
| 5,729,680 A | | 3/1998 | Belanger et al. |
| 5,757,783 A | | 5/1998 | Eng et al. |
| 5,796,727 A | * | 8/1998 | Harrison et al. ............ 370/338 |
| 5,822,309 A | | 10/1998 | Ayanoglu et al. |
| 5,881,372 A | | 3/1999 | Kruys |
| 5,903,832 A | * | 5/1999 | Seppanen et al. ........... 455/414 |
| 5,987,024 A | | 11/1999 | Duch et al. |
| 6,134,587 A | * | 10/2000 | Okanoue .................... 709/222 |

OTHER PUBLICATIONS

1997 Proceedings of the General Convention of the Electronic Information Communications Society, Communications 2, B–7–147, Kazuhiro Okanoue, Chie Ozawa, "IP Multicast Packet Transmission Control with a Mobile Host," p. 276.

Technological Research Report of the Electronic Information Communication Society, vol. 97 No. 353, SSE97–133, Kazuhiro Okanoue, et al., "IP Multicast Expansion for Mobile Host Response," pp. 43–48.

* cited by examiner

FIG. 9
PRIOR ART
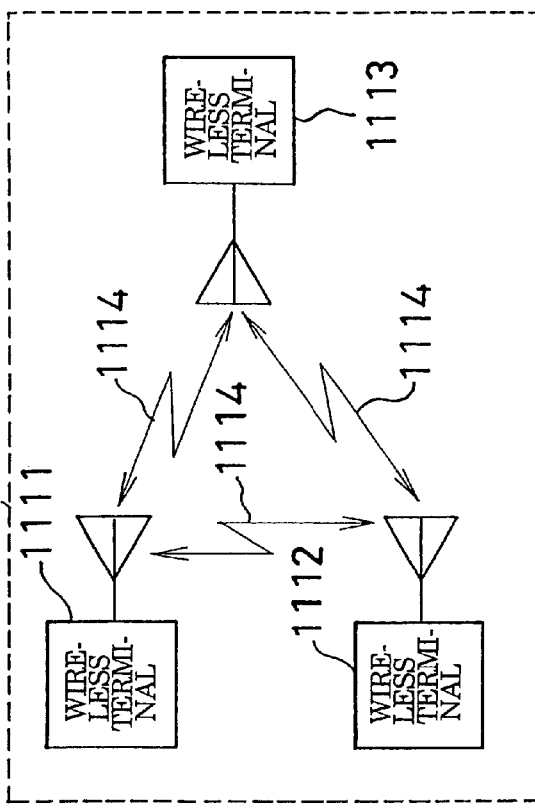
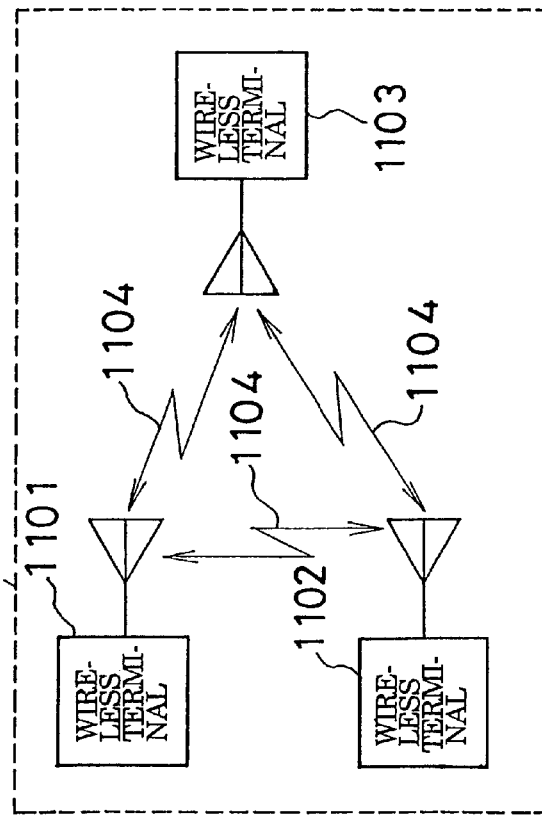

METHOD OF SETTING UP AD HOC LOCAL AREA NETWORK, METHOD OF COMMUNICATING USING SAID NETWORK, AND TERMINAL FOR USE WITH SAID NETWORK

This is a divisional application Ser. No. 08/993,652 filed Dec. 18, 1997, the disclosure of which is incorporated herein by reference.

FIELD OF THE INVENTION

This invention relates to a method of setting up a temporary local area network (also referred to as a "LAN") generally set up solely of terminals and not having a fixed backbone network, a method of communicating using this network, and a terminal for use in the network.

BACKGROUND OF THE INVENTION

Known examples of LAN configurations include a LAN connected to a fixed backbone network via a router of the kind described in document (1) "Interconnections: Bridges and Routers" by Radia Perlman, Addison-Wesley, 1992 (this LAN is referred to as a "backbone-connected LAN"), and a LAN temporarily set up solely of terminals and not connected to a backbone network via a router, as described in document (2) "Routing in Ad Hoc Networks of Mobile Hosts" by David B. Johnson, Proceedings of the Workshop on Mobile Computing Systems and Applications, pp. 158~163, IEEE Computer Society, Santa Cruz, Calif., December 1994 (this LAN is referred to as an "ad hoc LAN").

These LANs have different features and the circumstances in which they are used differ in the following way: In the case of the backbone-connected LAN, communication is carried out among terminals and servers connected to other LANs mutually connected by a fixed backbone network. A backbone-connected LAN is suited to a regularly performed operation such as the sending and receiving of electronic mail for a daily business.

An ad hoc LAN, on the other hand, brings together terminals having a communication function and only these terminals communicate with one another. This LAN is useful in a scenario such as a conference in which the participants gather together bringing their terminals with them.

The configurations of a backbone-connected LAN and ad hoc LAN are illustrated in FIGS. 8 and 9, respectively.

As shown in FIG. 8, backbone-connected LANs 1010, 1020 are connected to a backbone network 1000. Though only two backbone-connected LANs are depicted in FIG. 8, there are instances where three or more of these LANs are thus connected.

The internal construction of the backbone-connected LANs will be described taking the LAN 1010 as an example.

As shown in FIG. 8, the backbone-connected LAN 1010 is connected to the backbone network 1000 via a router 1005. Conceivable transmission media are a physical wire as at 1007 or a wireless link as at 1006. Examples of terminals used within the backbone-connected LAN are a wired terminal 1004 connected via the wire transmission medium 1007 and wireless terminals 1001, 1002 connected via the wireless transmission medium 1006. The wireless terminals 1001, 1002 are capable of communicating with the wired terminal 1004 and router 1005, which are connected to the wired medium 1007, via a wireless base station 1003.

Further, the terminals in the backbone-connected LAN 1010 communicate with terminals connected to another backbone-connected LAN, such as the backbone-connected LAN 1020, via the router 1005 and backbone network 1000.

The ad hoc LAN, on the other hand, is constructed as shown in FIG. 9. FIG. 9 schematically illustrates the manner in which two ad hoc LANs 1100 and 1110 exist. Though only two ad hoc LANs are depicted in FIG. 9, there are instances where three or more of these LANs may exist.

As shown in FIG. 9, the ad hoc LANs 1100 and 1110 include three wireless terminals 1101, 1102, 1103 and 1111, 1112, 1113, respectively. The wireless terminals within each ad hoc LAN communicate with one another via wireless transmission media 1104 and 1114, respectively, but there is no communication between the ad hoc LANs. Though FIG. 9 illustrates an arrangement in which the ad hoc LANs use wireless transmission media, it is possible to adopt an arrangement in which only wired transmission media are used or one in which both wired and wireless transmission media are employed.

A method relying upon connection by a router and a method relying upon connection by a bridge are known as methods of connecting different LANs. For example, see the document (1) above ("Interconnections: Bridges and Routers" by Radia Perlman, Addison-Wesley, 1992).

Such arrangements are illustrated in FIGS. 10 and 11, which show the manner in which a terminal A (1121) and a terminal B (1131) communicate with each other in a case where different LANs comprising respective transmission media 1120, 1130 are interconnected via a relay node 1125 (FIG. 10) or 1126 (FIG. 11).

FIG. 10 illustrates connection by router, in which the relay node 1125 functions as the router. In this case the relay node 1125 is such that processing for transferring packets used in communication between the terminal A and the terminal B is executed in the network layer.

FIG. 11, on the other hand, illustrates connection by bridge, in which the relay node 1126 functions as the bridge. In this case the relay node 1126 is such that processing for transferring packets used in communication between the terminal A and the terminal B is executed in the data link layer.

The router arrangement is implemented using addresses in the network layer. Though transfer processing presents a heavy load, flexible control is possible.

With the bridge arrangement, on the other hand, only simple transfer control can be carried out but the transfer processing is simple.

Multicast communication is known as a communication scheme in which bandwidth is utilized effectively. According to multicast communication, a plurality of parties are defined as a group, and in case of communication within the group, data is not transmitted to the individual parties but is instead multicast to the defined group by a single transmission. For a description of multicasting, see document (3) "Mbone: Interactive Multimedia on the Internet" by Vinay Kimar, New Riders Publishing, 1995 etc.

Multicasting is implemented by defining a multicast address for each multicast group. In a case where data is transmitted to a certain multicast group, the data is transmitted with the multicast address of this group serving as the destination address. A terminal participating in the multicast group receives the data that has been transmitted using the multicast address of the group as the destination of the transmission. The packet format used in such multicast communication is as shown in FIG. 14. As shown in FIG. 14, the format includes a network layer header 1300 and higher layer data 1301. The network layer header 1300 includes a multicast address as the destination and a transmitting terminal address as the address of the transmitting party.

DISCUSSION ON THE RELATED ART

In the course toward the prevent invention, the following problems have been encountered.

From the user standpoint, it would be desirable to be able to simultaneously perform, through use of a single terminal, daily communication such as email communication using a backbone-connected LAN and temporary communication provided by an ad hoc LAN. However, a backbone-connected LAN and an ad hoc LAN are separate, independent entities and one terminal cannot be connected to both LANs at the same time. This means that two different terminals are required in a case where the user wishes to communicate with both a backbone-connected LAN and an ad hoc LAN.

Conventional methods of connecting two different LANs include the bridge connection and the router connection, as illustrated in FIGS. 10 and 11.

If a terminal possesses a function for implementing a connection between LANs, it is possible for the terminal to be connected to both a backbone-connected LAN and an ad hoc LAN. However, most terminals have a construction of the kind shown in FIG. 12.

As illustrated in FIG. 12, network layer software 211 performs an exchange of data with a device driver 1200, which is dependent upon a transmitter/receiver 1201 that executes the processing of a data link layer and physical layer, via a standard interface (interface 1 in FIG. 12) such as one in accordance with the NDIS (Network Driver Interface Standard).

Thus, the usual terminal has a construction different from that of the relay nodes 1125, 1126 in FIGS. 10 and 11.

In order for a terminal to be provided with a function (a router function) similar to that of the relay node 1125 (see FIG. 10), it is required that the network layer software 211 be modified. In order for a terminal to be provided with a function (a bridge function) similar to that of the relay node 1126 (see FIG. 11), it is required that the transmitter/receiver 1201 or device driver 1200 be modified. Consequently, the modification costs entailed to enable a terminal to be connected to both LANs are high.

Even if the cost of modifying the terminal is acceptable, a problem which remains is the network architecture that will allow the terminal to distinguish between the backbone-connected LAN and the ad hoc LAN.

Furthermore, in a case where a plurality of ad hoc LANs exist and multicast communication is performed within each ad hoc LAN, a problem of the kind shown in FIG. 13 can arise. FIG. 13 illustrates an example of a case where wireless links are used as the means of transmission.

As shown in FIG. 13, wireless terminals 301~304 construct an ad hoc LAN referred to as "ad hoc LAN A", and wireless terminals 320~322 construct a different ad hoc LAN referred to as "ad hoc LAN B". The areas capable of being reached by the radio waves from wireless terminals 301~304 and 320~322 are indicated by circles 310~313 and 330~332, respectively.

The wireless terminals 301~304 and 320~322 perform multicast communication within their own ad hoc LANs, respectively, using the packet shown in FIG. 14.

Since the areas within range of the radio waves from the terminals participating in multicasting within one of the ad hoc LANs and the areas within range of the radio waves from the terminals participating in multicasting within the other ad hoc LAN are not supposed to overlap each other, there is a possibility that both ad hoc LANs will be using identical multicast addresses.

Assume that the wireless terminal 303 connected to ad hoc LAN A attempts to participate in a multicast communication in progress among the wireless terminals 301, 302, 304 of ad hoc LAN B in a case where both ad hoc LANs are using the same multicast address. In such case the radio waves from wireless terminal 303 will reach the wireless terminal 321, which therefore will receive a different multicast communication but one having the same internet program (IP) multicast address. Thus, in cases where communication is carried out using the conventional packet format in an ad hoc LAN, duplication of multicast addresses is possible.

SUMMARY OF THE INVENTION

Accordingly, an object of the present invention is to provide an ad hoc network configuration, terminal and communication method or system through which it is possible to achieve connection and communication simultaneously between local area networks interconnected by a high-speed network (which local area networks are referred to as "backbone-connected LANs") and temporary LANs (referred to as "ad hoc LANs") not connected to a backbone network.

Further objects will become apparent in the entire disclosure.

According to a first aspect of the present invention, there is provided a method or system of setting up an ad hoc LAN wherein there simultaneously exist a plurality of backbone-connected LANs interconnected by a backbone network via routers and each having a plurality of terminals (referred to as "terminal group 1") connected thereto, and a plurality of ad hoc LANs unconnected to the backbone network and each having a plurality of terminals (referred to as "terminal group 2") connected thereto. A plurality of groups (referred to as "multicast groups"), in which all or part of the terminal groups 1 are members, are set up dynamically within a network constituted by the backbone network and backbone-connected LANs. Identifiers which identify respective ones of the multicast groups are defined for the multicast groups, communication between the members constituting the multicast groups is performed using the identifiers which identify the multicast groups. All or part of the terminal groups 2 are capable of communicating simultaneously not only with terminals connected to the ad hoc LANs to which the terminal groups 2 are connected but also with terminals connected to the backbone-connected LANs. In the method or system identifiers are decided which identify the multicast groups, for each of the ad hoc LANs, and identifying each of the ad hoc LANs using the identifiers.

According to a second aspect of the present invention, there is provided a terminal connectable to a backbone-connected LAN and to an ad hoc LAN simultaneously in an environment in which there simultaneously exist a plurality of backbone-connected LANs interconnected by a backbone network via routers and each having a plurality of terminals (referred to as "terminal group 1") connected thereto, and a plurality of ad hoc LANs unconnected to the backbone network and each having a plurality of terminals (referred to as "terminal group 2") connected thereto. A plurality of groups (referred to as "multicast groups"), in which all or part of the terminal groups 1 are members, are set up dynamically within a network constituted by the backbone network and the backbone-connected LANs. Identifiers which identify respective ones of the multicast groups are defined for the multicast groups; communication between the members constituting the multicast groups is performed using the identifiers which identify the multicast groups. All or part of the terminal groups 2 are capable of communicating simultaneously not only with terminals connected to the ad hoc LANs to which the terminal groups 2 are connected but also with terminals connected to the backbone-connected LANs. The terminal is capable of communicating simultaneously not only with terminals connected to the ad hoc LANs but also with terminals connected to the backbone-connected LAN; the terminal comprising: (a) a transceiver for ad hoc LAN purposes for sending signals to and receiving signals from transmission media constituting the ad hoc LANs; (b) a transceiver for backbone-connected LAN purposes for sending signals to and receiving signals from transmission media constituting the backbone-connected LANs; (c) a device driver for ad hoc LAN purposes corresponding to the transceiver for ad hoc LAN purposes; (d) a device driver for backbone-connected LAN purposes corresponding to the transceiver for backbone-connected LAN purposes; and (e) a device driver controller for sending signals to and receiving signals from both the device driver for ad hoc LAN purposes and the device driver for backbone-connected LAN purposes via a predetermined interface (referred to as "interface 1"), and sending signals to and receiving signals from network layer software via the interface 1.

According to a third aspect of the present invention, there is provided a system or method of communication within an ad hoc LAN in an environment in which there simultaneously exist a plurality of backbone-connected LANs interconnected by a backbone network via routers and each having a plurality of terminals (referred to as "terminal group 1") connected thereto, and a plurality of ad hoc LANs unconnected to the backbone network and each having a plurality of terminals (referred to as "terminal group 2") connected thereto. A plurality of groups (referred to as "multicast groups"), in which all or part of the terminal groups 1 are members, are set up dynamically within a network constituted by the backbone network and the backbone-connected LANs; identifiers which identify respective ones of the multicast groups are defined for the multicast groups; communication between the members constituting the multicast groups is performed using the identifiers which identify the multicast groups; and it is so arranged that all or part of the terminal groups 2 are capable of communicating simultaneously not only with terminals connected to the ad hoc LANs to which the terminal groups 2 are connected but also with terminals connected to the backbone-connected LANs. The method comprising the steps of: (a) adding a network layer header, which is created based upon a destination address and an address of transmitting terminal, onto transmission data; and (b) communicating the transmission data, onto which the network layer header has been added, using a packet encapsulated by an encapsulation header created employing the identifier identifying an ad hoc LAN as a destination and employing the address of the transmitting terminal as the source of transmission.

According to a fourth aspect of the present invention, the identifiers for identifying the multicast groups set up in the ad hoc LANs are acquired through the following sequence: (a) a terminal A which starts the ad hoc LAN (referred to as "ad hoc LAN 1") transmits an identification test message and activates a timer, wherein the identifier test message includes an identifier (referred to as "identifier 1"), for identifying a multicast group, desired to be used as the identifier of the ad hoc LAN 1, and has a predetermined address as the destination; (b) in a case where a terminal B that has received the identifier test message is already using the identifier 1, contained in the identifier test message, as the multicast group identifier within the backbone-connected LAN to which the terminal B is currently connected or as the identifier of another ad hoc LAN 2, the terminal B transmits an identifier refusal message, which includes the identifier 1, with the predetermined address as the destination; (c) in a case where the identifier refusal message is not received by the time the timer, which was activated by the terminal A that starts the ad hoc LAN 1, runs out of time, it is judged that the identifier 1 is not being used and this identifier is adopted as the identifier of the ad hoc LAN 1; (d) in a case where the identifier refusal message is received before the timer, which was activated by the terminal A that starts the ad hoc LAN 1, runs out of time, it is judged that the identifier 1 is currently in use; and (e) until an identifier judged ot to be in use is obtained, the terminal A that starts the ad hoc LAN 1 recursively transmits an identifier test message containing a different identifier and activates the timer.

According to a fifth aspect of the present invention, the device river controller of the terminal connected to the ad hoc LAN (a) manages an address list which includes other terminals connected to the ad hoc LAN to which the terminal is connected as well as identifiers of existing multicast groups, and (b) in a case where the terminal transmits data, delivers the transmission data to the device driver for ad hoc LAN purposes if a destination address exists in the address list and to the device driver for backbone-connected LAN purposes if the destination address does not exist in the address list.

According to a sixth aspect of the present invention, the address list of the device driver controller of the terminal connected to the ad hoc LAN is created as follows: (a) each terminal connected to the ad hoc LAN periodically transmits an address announcement message to a predetermined destination or destinations, wherein this address announcement message includes the address of the transmitting terminal and the identifier of the participating multicast group within the ad hoc LAN; and (b) the address announcement message is received by any of destinated terminals wherein the address list is created based upon the address of the transmitting terminal and the identifier of the participating multicast group within the ad hoc LAN, the address and the identifier being included in the address announcement message received by the destinated terminals.

According to a seventh aspect of the present invention, the device driver controller of the terminal connected to the ad hoc LAN (a) has the address list described above (refer to sixth aspect); (b) in a case where the terminal transmits data to a multicast group within the ad hoc LAN, the device driver controller creates the encapsulation header (refer to third aspect) by using an identifier which identifies the ad hoc LAN and the address of the terminal, to add the encapsulation header onto the transmission data, and delivers the transmission data to the device driver for ad hoc LAN purposes (refer to second aspect); and (c) upon receiving data from a multicast group within the an ad hoc LAN from the device driver for ad hoc LAN purposes, the device controller removes the encapsulation header from the received data and delivers the data to the network layer software of the terminal.

According to an eighth aspect, there is provided an ad hoc LAN in an environment in which there simultaneously exist a backbone-connected LAN connected by a backbone network via a router and having one or a plurality of terminals connected thereto, and an ad hoc LAN unconnected to said backbone network; wherein a terminal group constructs one or a plurality of multicast groups within a network constituted by the backbone network and the backbone-connected LAN. Identifiers which identify respective ones of the multicast groups are defined for said multicast groups. Communication between members of the terminal group constituting the multicast groups is performed using the identifiers which identify the multicast groups. And the ad hoc LAN is set up as a multicast group and a multicast address is appropriately assigned thereto, enabling to distinguish said ad hoc LAN from other multicast groups which exist within said backbone-connected LAN and backbone network.

According to a ninth aspect, there is provided a terminal connectable to both an ad hoc LAN and a backbone-connected LAN simultaneously, comprising: (a) a device driver and a transceiver implementing a data link layer and a physical layer decided in each LAN in order to make a connection to both said ad hoc LAN and said backbone-connected LAN; and (b) a device driver controller between a network layer and said device driver.

The device driver controller has an address list of other terminals connected within the ad hoc LAN to which its own terminal is connected; wherein:

(1) in a case where data is transmitted from its own terminal, said device driver controller accepts transmission data, from a higher layer, supplied by said network layer upon having a destination address added thereto, refers to said address list, determines whether the destination address is a terminal in an ad hoc LAN or in a backbone-connected LAN, selects a suitable device driver and transceiver and outputs the transmission data;

(2) in a case where its own terminal transmits data to a multicast group within an ad hoc LAN, said device driver controller creates an encapsulation header using an identifier which identifies said ad hoc LAN and an address of its own terminal, adds said encapsulation header onto the transmission data and supplies the transmission data to the device driver for the ad hoc LAN; and (3) when data from a multicast group within said ad hoc LAN is received from the device driver for the ad hoc LAN, said device driver controller removes the encapsulation header from the received data and delivers the received data to said network layer.

Thus, in accordance with the present invention, as described above, it is possible to make a connection to both an ad hoc LAN and a backbone-connected LAN simultaneously so that both LANs can communicate with each other. This is achieved by making it possible to distinguish between an ad hoc LAN and a backbone-connected LAN and arranging it so that duplication of multicast group addresses will not occur.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 9 is a diagram showing the construction of ad hoc LANs;

DESCRIPTION OF THE PREFERRED EMBODIMENTS

Figure 1:
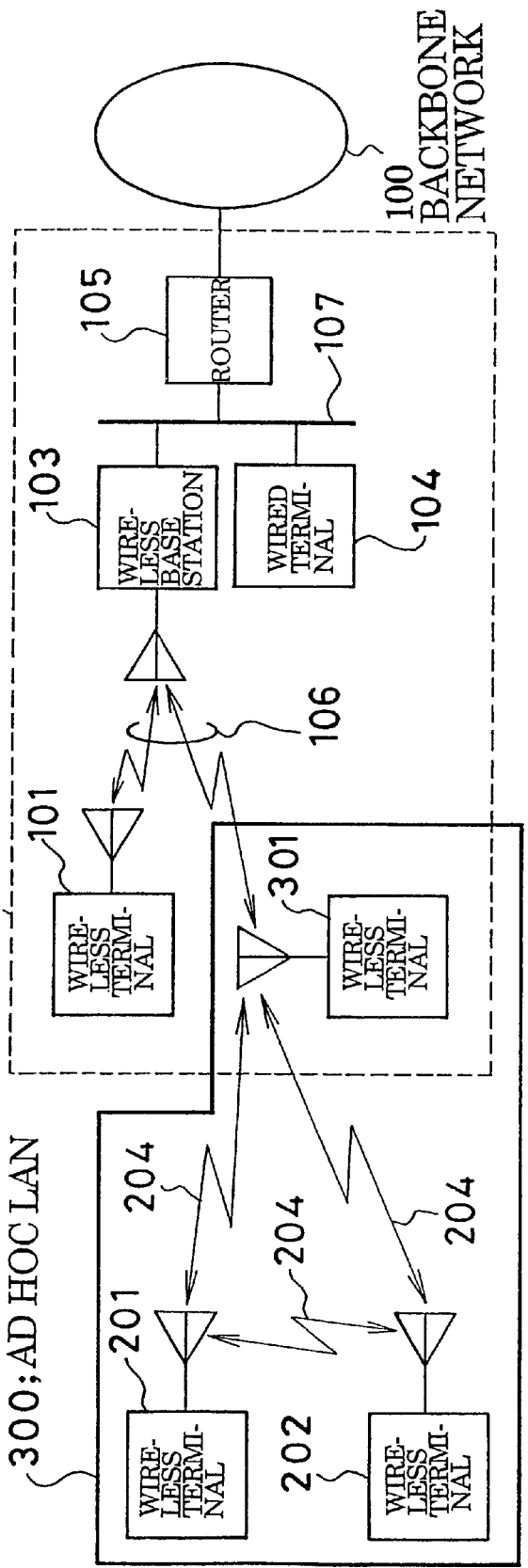
FIG. 1, which is a diagram useful in describing an embodiment of the present invention, shows the construction of a network in which an ad hoc LAN and backbone-connected LAN coexist.

A preferred embodiment of the present invention will be described below.

In the preferred embodiment of the present invention, an ad hoc LAN is defined as a multicast group, which is defined within a backbone-connected LAN and its backbone network. By thus defining the ad hoc LAN, a terminal which participates in this ad hoc LAN assumes a state the same as that of a terminal which participates in one of the multicast groups defined within a network constituted by the backbone-connected LAN and its backbone network.

For example, in case of a backbone-connected LAN and its backbone network, an IP multicast address is assigned to each multicast group and each multicast group is identified by an IP multicast as in the Internet in which the IP (Internet Protocol) serves as the network layer.

An IP multicast address can be assigned dynamically, without the occurrence of duplication, within limits determined on the basis of the network topology and management policy of each multicast group. For example, see (3) "Mbone: Interactive Multimedia on the Internet" by Vinay Kimar, New Riders Publishing, 1995.

An ad hoc LAN is constructed by assigning an IP multicast address that will not be duplicated between this ad hoc LAN and a backbone-connected LAN, backbone network or other ad hoc LAN.

If this arrangement is adopted, a terminal connected to both an ad hoc LAN and a backbone-connected LAN will be capable of participating in the ad hoc LAN just as in a case where the terminal participates in a multicast group defined within a backbone-connected LAN. Matching of the backbone-connected LAN and ad hoc LAN is improved.

Further, in the preferred embodiment of the invention, a device driver controller is inserted between the network layer software and a device driver to construct a terminal capable of being connected to both the ad hoc LAN and the backbone-connected LAN.

The device driver controller of the terminal connected to both the ad hoc LAN and backbone-connected LAN in the preferred embodiment of the invention will be described in brief below.

The terminal includes an ad hoc LAN transceiver (224 in FIG. 2) for sending signals to and receiving signals from a transmission medium constituting the ad hoc LAN, a backbone-connected LAN transceiver (222 in FIG. 2) for sending signals to and receiving signals from a transmission medium constituting the backbone-connected LAN, an ad hoc LAN device driver (223 in FIG. 2) corresponding to the transceiver of the ad hoc LAN, a backbone-connected LAN device driver (221 in FIG. 2) corresponding to the backbone-connected LAN transceiver, and a device driver controller (200 in FIG. 2) for sending and receiving signals to and from both the device driver for the ad hoc LAN and the device driver for the backbone-connected LAN via a prescribed interface (interface 1), and for sending and receiving signals to and from the network layer software via the interface 1.

The device driver controller 200 manages an address list which includes other terminals connected to the ad hoc LAN to which the above-mentioned terminal is connected as well as the identifiers of existing multicast groups. In a case where the terminal transmits data, the transmission data is delivered to the device driver for the ad hoc LAN if the destination address exists in the address list and to the device driver of the backbone-connected LAN if the above-mentioned destination address does not exist in the address list.

The address list is constructed as follows: Each terminal connected to an ad hoc LAN periodically transmits an address announcement message (see FIG. 5) to a predetermined destination. This address announcement message includes the address of the terminal and the identifier of the participating multicast group within the ad hoc LAN. The destinated terminals receive the address announcement message. The address list is created based upon the address of the terminal and the identifier of the participating multicast group in the ad hoc LAN, wherein this address and identifier are included in the address announcement message received by the terminal.

In a case where the terminal transmits data to the multicast group within the ad hoc LAN, the device driver controller of the terminal uses the identifier which identifies the ad hoc LAN and the address of the transmitting terminal to construct an encapsulation header (350 in FIG. 6), adds this header onto the transmission data and then delivers the transmission data to the device driver of the ad hoc LAN.

Further, when data from a multicast group within an ad hoc LAN is received from the device driver of the ad hoc LAN, the encapsulation header is removed from the received data and the data is then delivered to the network layer.

By adopting this arrangement according to the embodiment of the invention, the cost of constructing a terminal capable of being connected to both LANs is reduced merely by adding on the device driver controller and without modifying the software that has been installed in the terminal.

Furthermore, in a case where a plurality of ad hoc LANs coexist, not only must communication between the ad hoc LANs and a backbone-connected LAN be discriminated but so must communication among the ad hoc LANs.

To this end, an identifier such as an IP multicast address assigned to each ad hoc LAN is encapsulated in the header for the destination, thus making it possible to perform communication while distinguishing among ad hoc LANs.

In a preferred embodiment of the present invention when an identifier which identifies a multicast group established in an ad hoc LAN is acquired, a terminal A (a "starting terminal" in FIG. 4) which starts the ad hoc LAN (referred to as "ad hoc LAN 1") transmits an identifier test message and activates a timer. The identifier test message includes an identifier 1, which is for identifying a multicast group, desired to be used as the identifier of the ad hoc LAN 1, and has a predetermined address (or addresses) as the destination.

In a case where another terminal (referred to as "terminal B") that has received the identifier test message is already using the identifier 1, contained in the identifier test message, as the above-mentioned multicast group identifier within the backbone-connected LAN to which terminal B is currently connected or as the identifier of another ad hoc LAN, the terminal B transmits an identifier refusal message, which includes the identifier 1, with the above-mentioned predetermined address (or addresses) as the destination.

In a case where the identifier refusal message is not received by the time the timer, which was activated by the terminal A that starts the ad hoc LAN 1, runs out of time, it is judged that the identifier 1 is not being used and this identifier is adopted as the identifier of the ad hoc LAN 1.

In a case where the identifier refusal message is received before the timer, which was activated by the terminal A that starts the ad hoc LAN 1, runs out of time, it is judged that the identifier 1 is currently in use. Until an identifier judged not to be in use is obtained, the terminal A that starts the ad hoc LAN 1 transmits an identifier test message containing a different identifier, activates the above-mentioned timer and acquires an identifier for identifying the multicast group for terminal A.

Detailed Description of the Preferred Embodiments

The preferred embodiments set forth above will now be described in greater detail with reference to the accompanying drawings. An embodiment will be described taking as an example a case in which the Internet Protocol (IP) is used in the network layers of the backbone-connected LAN, backbone network and ad hoc LAN.

FIG. 1 is a diagram illustrating the construction of an ad hoc LAN according to a preferred embodiment of the present invention. Shown in FIG. 1 are a backbone network 100, a backbone-connected LAN 110 and an ad hoc LAN 300, the network layer of each of which is employs the IP.

The backbone-connected LAN 110 is connected to the backbone network 100 via a router 105 and has a wired transmission medium 107. The backbone-connected LAN 110 has a wired terminal 104 connected to it directly via the wired transmission medium 107, and a wireless terminal 101 connected via a wireless transmission medium 106. The wireless terminal 101 is connected to the wired transmission medium 107 via wireless base station 103.

The wired terminal 104 and wireless terminal 101 connected to the backbone-connected LAN 110 communicate with the terminals within another backbone-connected LAN via the router 105 and backbone network 100.

Communication among the terminals connected to the backbone-connected LAN 110 is performed directly without the intermediary of the router 105.

The ad hoc LAN 300 is constituted by a wireless transmission medium 204 and has wireless terminals 201, 202 and 301. The wireless terminal 301 is connected to both the ad hoc LAN 300 and backbone-connected LAN 110.

According to this embodiment, the ad hoc LAN 300 is set up in the same manner as a multicast group defined in the network consisting of the backbone-connected LAN 110 and backbone network 100, and an IP multicast address is assigned to the ad hoc LAN 300 to distinguish it from other ad hoc LANs and multicast groups of the backbone-connected LAN and backbone LAN.

Figure 3:
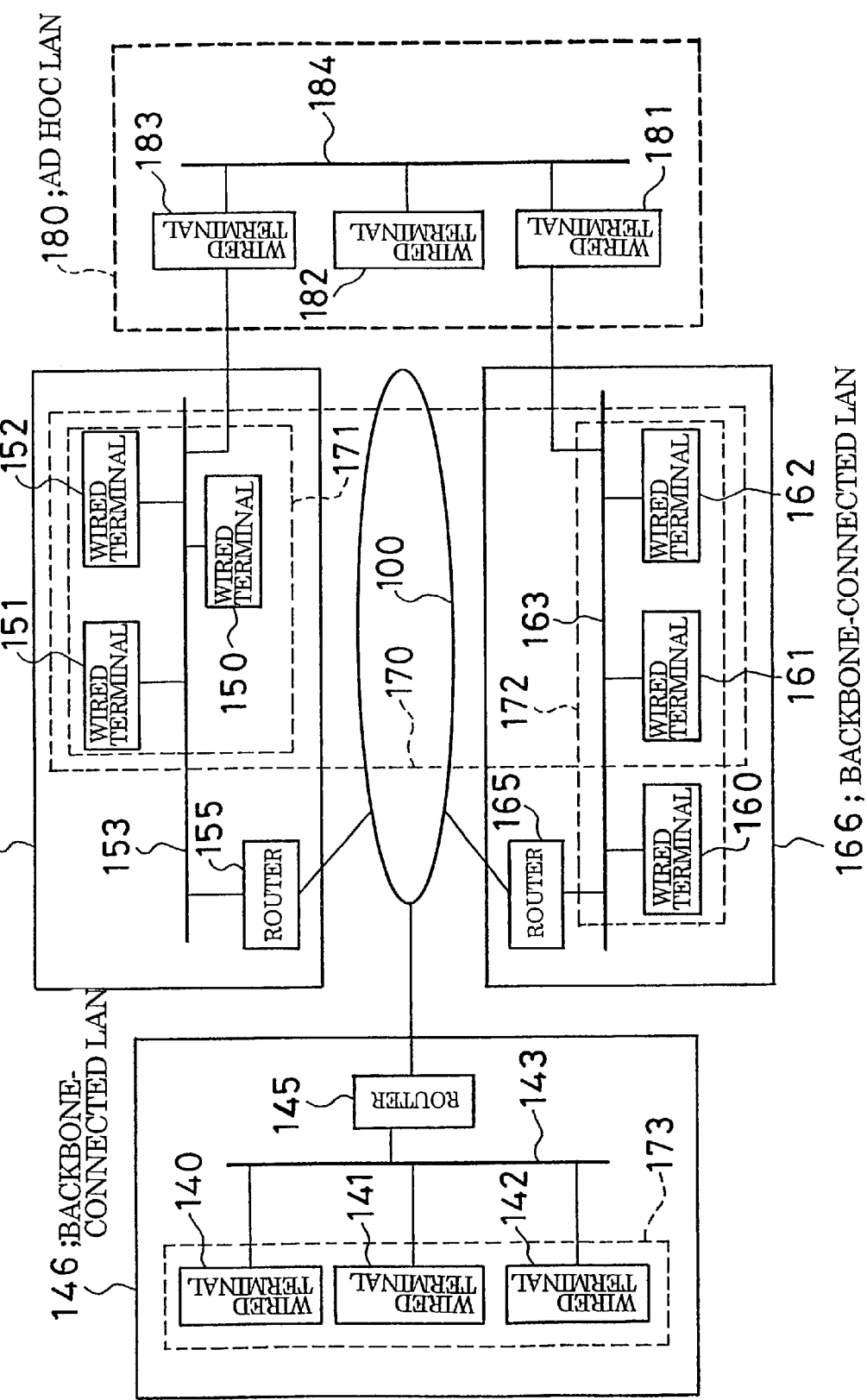
FIG. 3, which is useful in describing an embodiment of the present invention, is an explanatory view illustrating assignment of an ad hoc LAN identifier.

FIG. 3 illustrates the manner in which an IP multicast address used by an ad hoc LAN is assigned according to this embodiment.

As shown in FIG. 3, backbone-connected LANs 146, 156, 166 are connected to the backbone network 100 via routers 145, 155, 165, respectively. The backbone-connected LANs 146, 156, 166 have wired transmission media 143, 153, 163, respectively. Wired terminals 140–142, 150–152, 160–162 are connected to the wired transmission media 143, 153, 163, respectively. An ad hoc LAN 180 is constituted by a wired transmission edium 184 to which wired terminals 181~183 are connected.

The wired terminals 181, 183 are connected not only to the ad hoc LAN 180 but also to the backbone-connected LANs 166, 156, respectively.

Four multicast groups 170, 171, 172 and 173 indicated by the dashed lines in FIG. 3 exist within the backbone-connected LANs 146, 156, 166 and backbone network 100.

The members of the multicast group 170 are the wired terminals 150~152 and 161, 162, the members of the multicast group 171 are the wired terminals 150–152, the members of the multicast group 172 are the wired terminals 160~162, and the members of the multicast group 173 are the wired terminals 140–142.

Communication within the multicast groups 171, 172, 173 is confined to the backbone-connected LANs 156, 166, 146, respectively. This means that these multicast groups can use the same IP multicast address.

On the other hand, the multicast group 170 includes as members the wired terminals 150–152 and 161, 162 connected to the backbone-connected LANs 156 and 166, respectively, and must use an address that will not duplicate the IP multicast addresses being used by the other multicast groups 171, 172 existing in the backbone-connected LANs 156, 166, respectively.

However, it does not matter if the multicast group 170 has the same IP multicast address as the multicast group 173. Though three backbone-connected LANs are shown in FIG. 3, the foregoing holds for four or more backbone-connected LANs as well.

An IP multicast group address capable of being assigned to the ad hoc LAN 180 should be one not being used within the backbone-connected LANs 156, 166 to which the wired terminals 183, 181, respectively, are connected. In other words, it does not matter if the IP multicast address of the ad hoc LAN 180 is the same as the IP multicast address being used by multicast group 173 within the backbone-connected LAN 146.

Thus, an ad hoc LAN is set up as a multicast group and an IP multicast address is suitably assigned to this ad hoc LAN, thereby making it possible to distinguish this ad hoc LAN from other multicast groups which exist within the backbone-connected LANs and backbone network.

Figure 4:
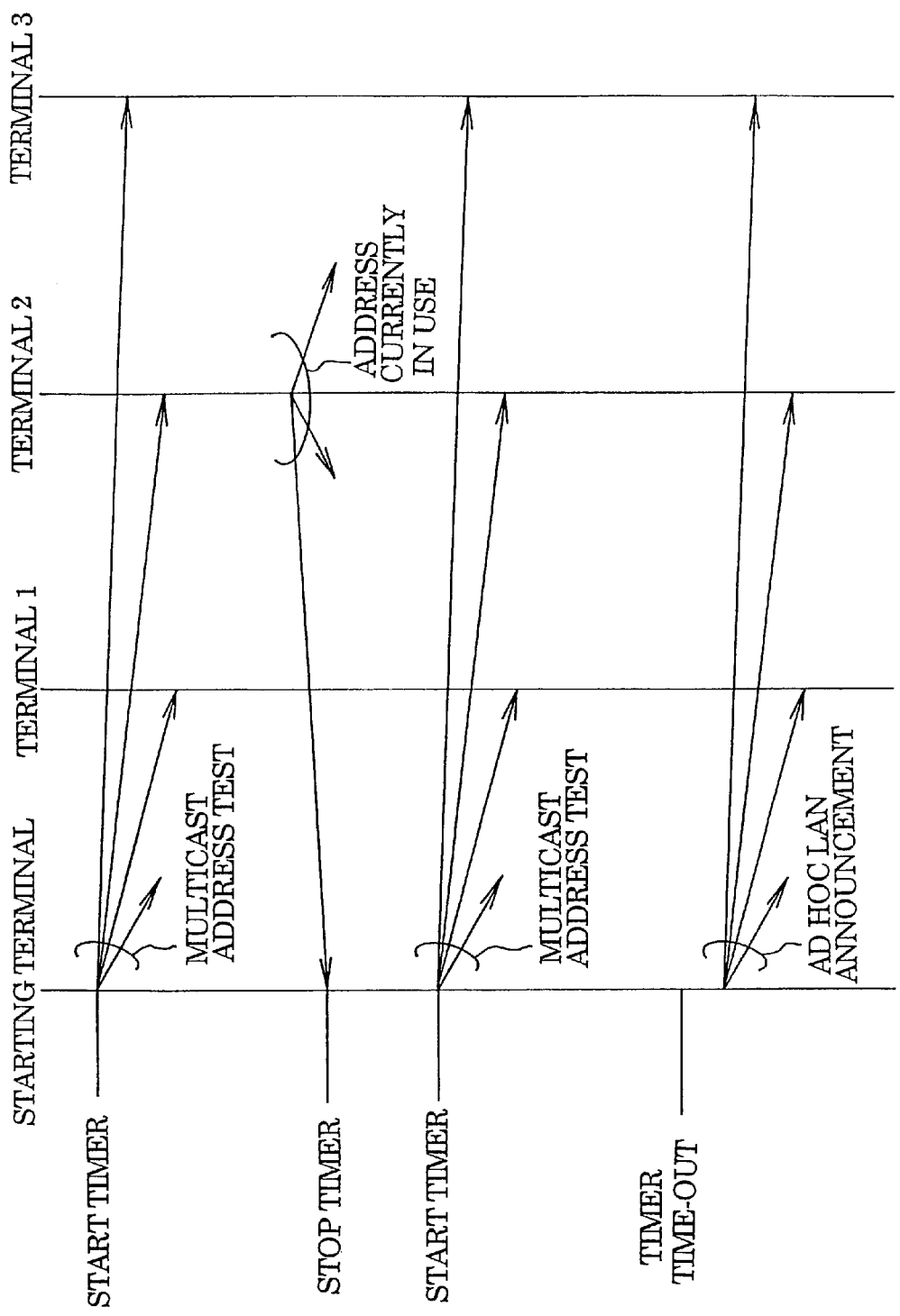
FIG. 4, which is useful in describing an embodiment of the present invention, is a diagram showing an example of a sequence for acquiring the identifier of an ad hoc LAN.

Assignment of the above-mentioned IP multicast address is achieved using the sequence shown in FIG. 4.

As illustrated in FIG. 4, a terminal (referred to as a "starting terminal") that is to construct an ad hoc LAN first transmits a message (referred to as a "multicast address test message"). This is a message for testing whether an IP multicast address desired to be employed for the terminal in order to construct the ad hoc LAN is currently in use.

The destination of this message employs a predetermined multicast or broadcast address. The starting terminal starts a timer and waits for a message (referred to as an "address in-use message") indicating that the desired IP multicast address is currently in use.

A terminal 2 is connected to the backbone-connected LAN and to another ad hoc LAN or solely to another ad hoc LAN. If the IP multicast address contained in the multicast address test message is already being used in this backbone-connected LAN or in the other ad hoc LAN, the terminal 2 transmits a message indicating that the address is in use. The message is transmitted using a predetermined multicast or broadcast address or addresses.

If the starting terminal receives this address in-use message from the terminal 2 before the timer runs out of time, the starting terminal recognizes the fact that the IP multicast address is currently in use and transmits a new multicast address test message using another IP multicast address.

If the address in-use message is not received by the time the timer runs out of time, the starting terminal judges that this IP multicast address is not in use and employs a message containing this IP multicast address to announce the existence of the ad hoc LAN by an "ad hoc LAN announcement message".

Figure 2:
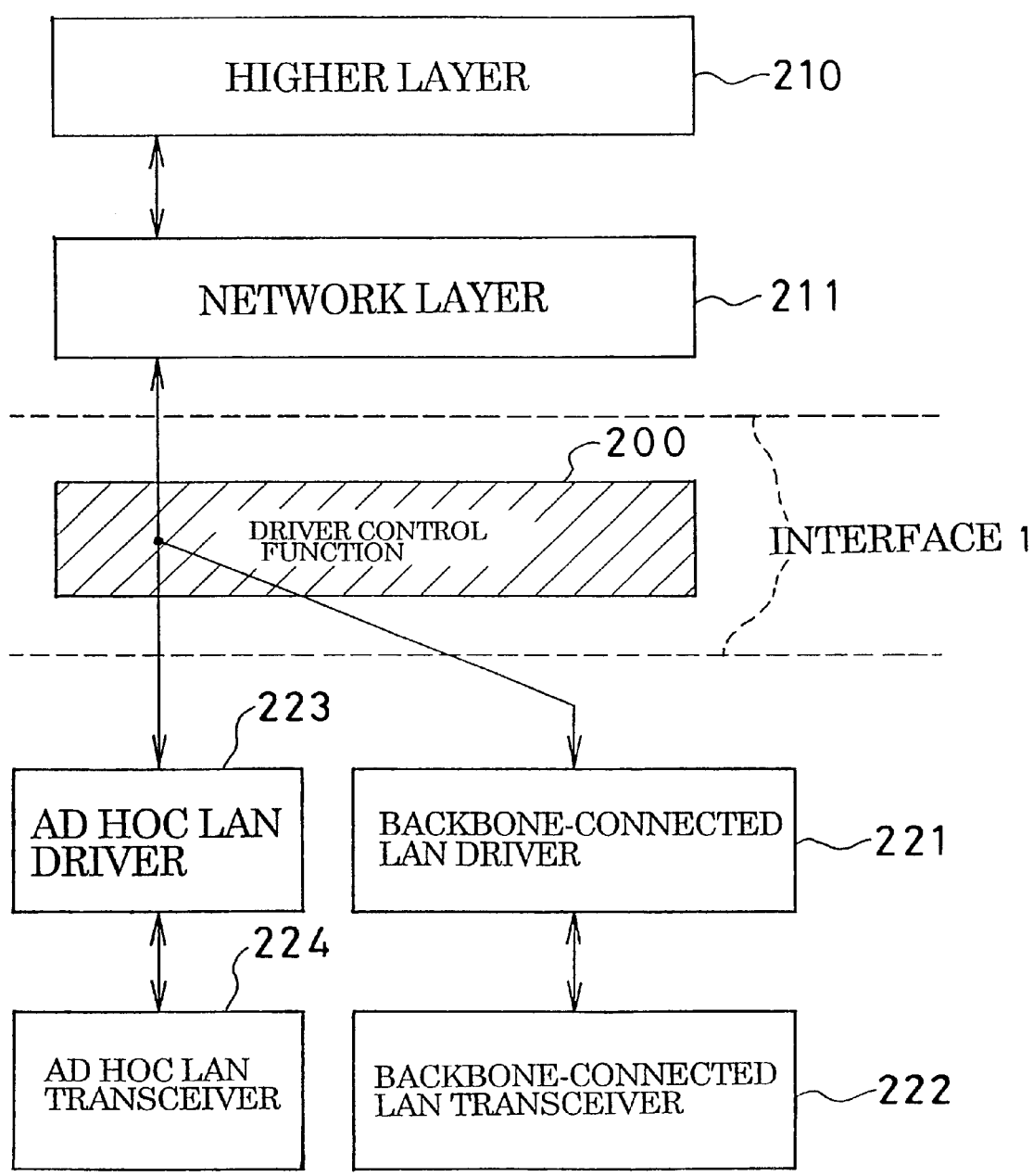
FIG. 2, which is useful in describing an embodiment of the present invention, is a system diagram of a terminal capable of being connected to an ad hoc LAN and backbone-connected LAN simultaneously.

FIG. 2 is a system diagram illustrating the construction of a terminal capable of being connected to an ad hoc LAN and backbone-connected LAN simultaneously according to the preferred embodiment of the invention.

In order to connect this terminal to both an ad hoc LAN and backbone-connected LAN, the terminal has a transceiver 222 for the backbone-connected LAN transceiver and a transceiver 224 for the ad hoc LAN. These are for implementing the data link layer and physical layer decided for each LAN. In addition, a driver 221 for the backbone-connected LAN and a driver 223 for the ad hoc LAN, which drivers are device drivers corresponding to the transceivers 222, 224, respectively, are installed in the terminal.

The ad hoc LAN driver 223 and backbone-connected LAN driver 221 have standard interfaces (interface 1) in accordance with the NDIS (Network Driver Interface Standard). In regard to the NDIS, see document (4) "PC Card Practical Bible", edited by Portable PC Technical Laboratory, published by Softbank K. K., 1995.

The software 211 of the network layer also has the standard interface (interface 1) in accordance with the NDIS etc.

According to this embodiment, a device driver controller 200 is disposed between the network layer software 211 and device drivers 221, 223. The device driver controller 200 sends and receives signals to and from the network layer software 211 and device drivers 221, 223 via the interfaces 1.

The device driver controller 200 has an address list of other terminals connected to the ad hoc LAN to which this terminal is connected.

In a case where this terminal transmits data, the network layer software 211 adds the destination address onto transmission data that has entered from a higher layer 210 and then outputs the data to the device driver controller 200 via the interface 1.

The device driver controller 200 refers to the address list and outputs the transmission data, via the interface 1, to the device driver 223 if the destination address is the address of a terminal within the ad hoc LAN and to the device driver 221 if the destination address is not the address of a terminal within the ad hoc LAN.

In a case where the terminal receives a signal transmitted by another terminal, the received data is supplied to the device driver controller 200, via the interface 1, from the device driver 223 if the transmitting terminal is a terminal within the ad hoc LAN and from the device driver 221 if the transmitting terminal is not a terminal within the ad hoc LAN. The device driver controller 200 outputs the received data to the network layer software 211 via the interface 1.

By constructing the terminal in this way, a terminal capable of being connected to both an ad hoc LAN and a backbone-connected LAN simultaneously can be obtained merely by adding on the device driver controller 200 and without modifying the network layer software 211 and device drivers 221, 223 already possessed by the terminal.

Figure 5:
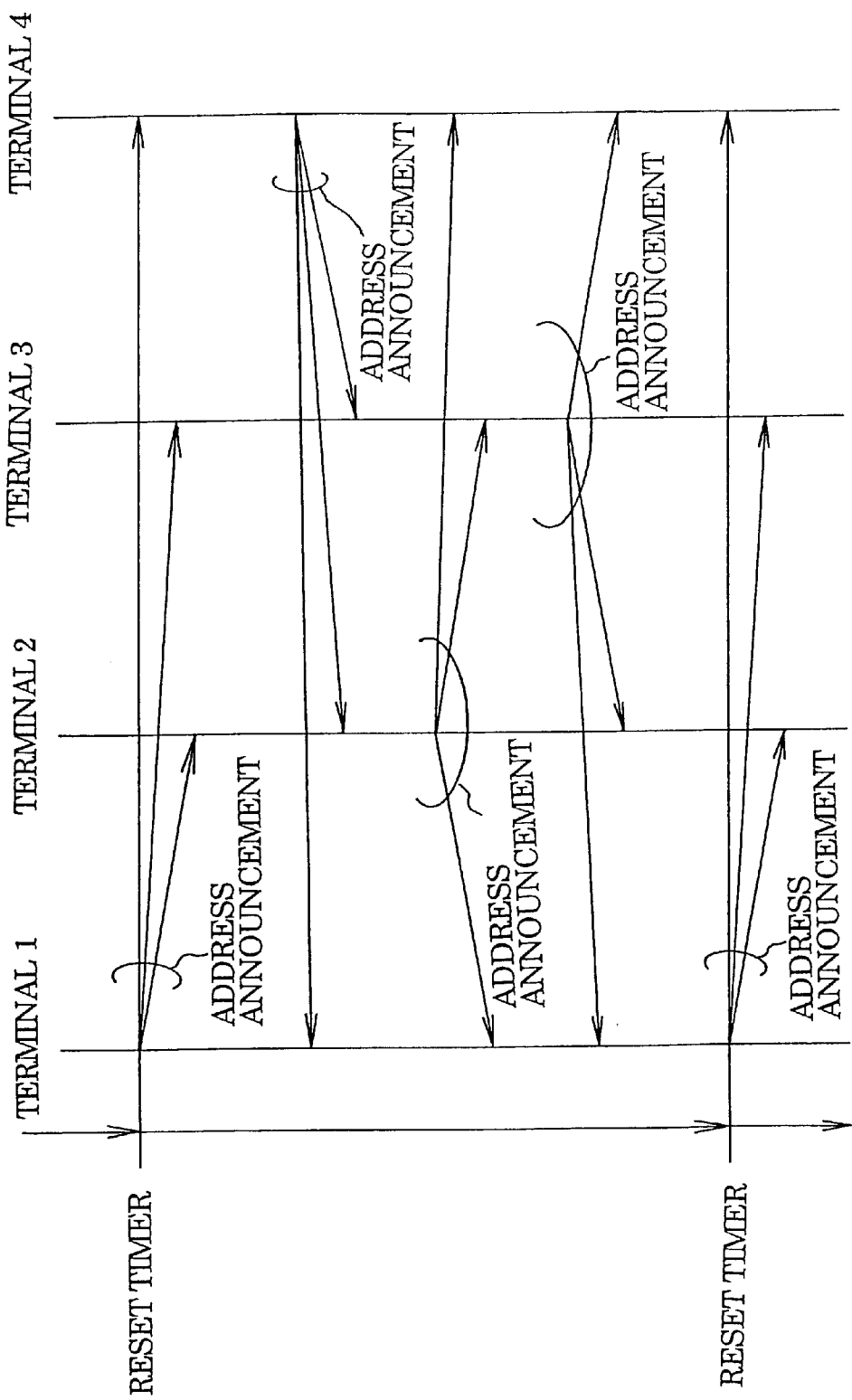
FIG. 5, which is useful in describing an embodiment of the present invention, is a diagram showing an example of a sequence for creating an address list of terminals connected to an ad hoc LAN and backbone-connected LAN.

The address list, which is managed by the device driver controller 200, of other terminals within the ad hoc LAN can be created using a sequence of the kind shown in FIG. 5, by way of example.

FIG. 5 is a diagram showing a sequence for creating an address list with regard to an ad hoc LAN composed of a total of four terminals, namely terminals 1 through 4.

As shown in FIG. 5, each terminal periodically gives notification, in the form of an address announcement message, of its own address and the IP multicast address used in multicast communication defined within the ad hoc LAN. If the destination of this message uses the IP multicast address that has been assigned to the ad hoc LAN, other terminals connected to another ad hoc LAN or to the backbone-connected LAN will not receive the message; the only terminals that will receive the message are those connected to the same ad hoc LAN.

If the device driver controller 200 receives the address announcement message, it is capable of ascertaining the address of the other terminal and the IP multicast address used in multicast communication within the ad hoc LAN.

Figure 6:
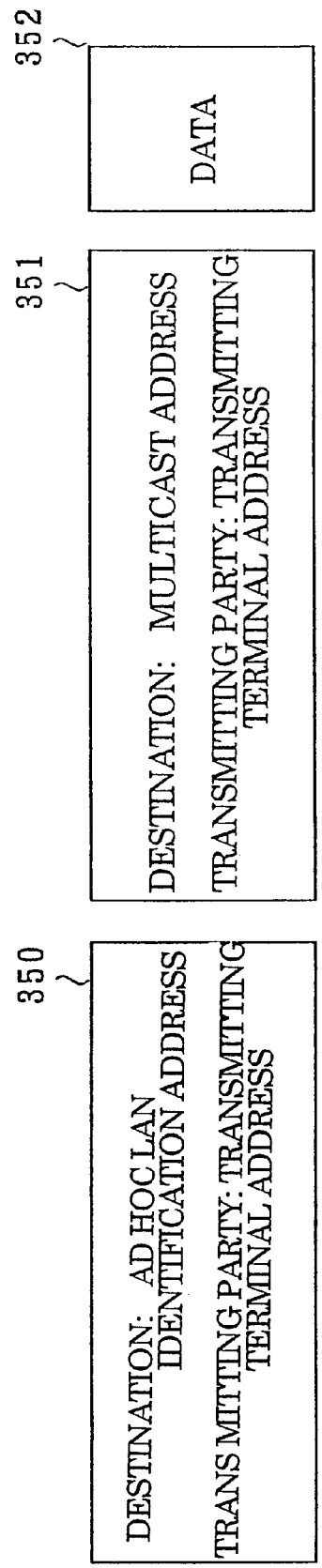
FIG. 6, which is useful in describing an embodiment of the present invention, is a diagram showing a packet format for performing multicast communication within an ad hoc LAN.

Further, in order to solve the problem of duplication of multicast addresses in an ad hoc LAN, an encapsulated packet of the kind shown in FIG. 6 is used in a case where multicast communication is carried out within an ad hoc LAN.

Shown in FIG. 6 are an encapsulation header 350 for performing encapsulation, a network layer header 351 and higher layer data 352. A feature of this embodiment is that the destination address of the encapsulation header 350 is an IP multicast address that identifies an ad hoc LAN.

By performing multicast communication within ad hoc LANs in the manner described above, the multicast packet within each ad hoc LAN is encapsulated by the encapsulation header whose destination is the multicast address assigned to the ad hoc LAN. As a consequence, an IP multicast address used by a multicast group within an ad hoc LAN need only be assigned so as not to cause duplication within this ad hoc LAN. The assignment may be made without regard to multicast groups within other ad hoc LANs.

The manner in which multicast communication is performed within an ad hoc LAN having a terminal, which has the structure shown in FIG. 2, connected to an ad hoc LAN and backbone-connected LAN will now be described.

In a case where the terminal transmits a multicast packet within the ad hoc LAN, first the network layer software 211 accepts the multicast signal data 352 (see FIG. 6) from the higher layer 210 and delivers the data to the device driver controller 200 upon adding on the network layer header 351 in which the IP multicast address of the destination serves as the destination address and the network layer address of the terminal serves as the address of the transmitting party.

The device driver controller 200 investigates the destination of the network layer header 351 and the address list within the ad hoc LAN. If the destination is the IP multicast address of a multicast group within the ad hoc LAN, the device driver controller 200 delivers the data to the device driver 223 of the ad hoc LAN upon adding on the encapsulation header 350 in which the IP multicast address that has been assigned to the ad hoc LAN serves as the destination address and the network layer address of the terminal serves as the address of the transmitting party.

On the other hand, in a case where the destination address of the network layer header 351 is an IP multicast address that is not an IP multicast address of a multicast group within the ad hoc LAN, the device driver controller 200 delivers the data to the device driver 221 for the backbone-connected LAN without adding on the encapsulation header 351.

The device drivers 221, 223 each add a data link layer header onto the transmission data delivered by the device driver controller 200 and transmit the data via the transceivers 222, 224 corresponding to the backbone-connected LAN and ad hoc LAN, respectively.

Reception in multicast communication is carried as follows:

Multicast communication within an ad hoc LAN is carried out using the encapsulated packet illustrated in FIG. 6. Upon receiving data communicated within the ad hoc LAN, the transceiver 224 for the ad hoc LAN outputs the received data to the device driver 223 for the ad hoc LAN. After the data link layer header is removed, the data is delivered to the device driver controller 200.

Figure 14:
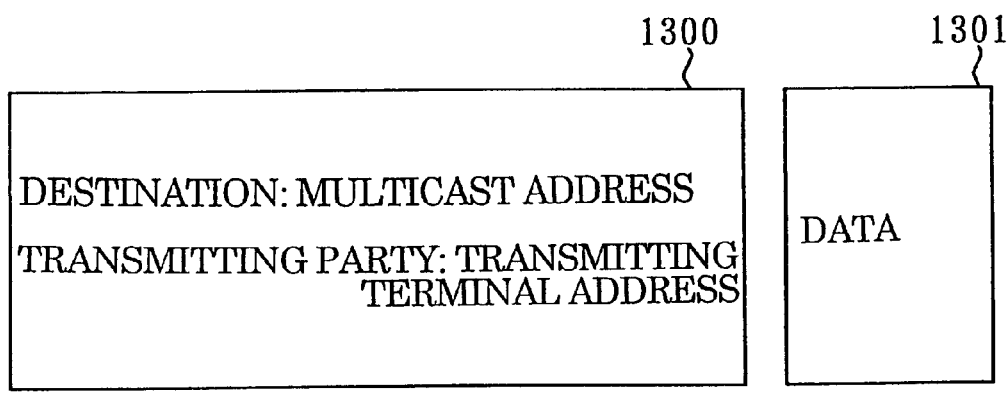
FIG. 14 is a diagram showing a packet format for performing multicast communication according to the prior art.

The encapsulated packet of FIG. 6 enters the device driver controller 200 in case of multicast communication within the ad hoc LAN, and the packet of FIG. 14 enters the device driver controller 200 in case of multicast communication with the backbone-connected LAN.

The device driver controller 200 removes the encapsulation header 350 from an encapsulated packet that has entered from the ad hoc LAN device driver 223 and then delivers the packet to the network layer software 211. At this time the device driver controller 200 investigates the multicast address which is the destination of the network layer header 351 and is capable of discarding the packet if the address is that of a multicast group in which the terminal of the controller is not participating.

On the other hand, a multicast packet that has entered from the device driver 221 of the backbone-connected LAN is output to the network layer software 211 as is.

Figure 7:
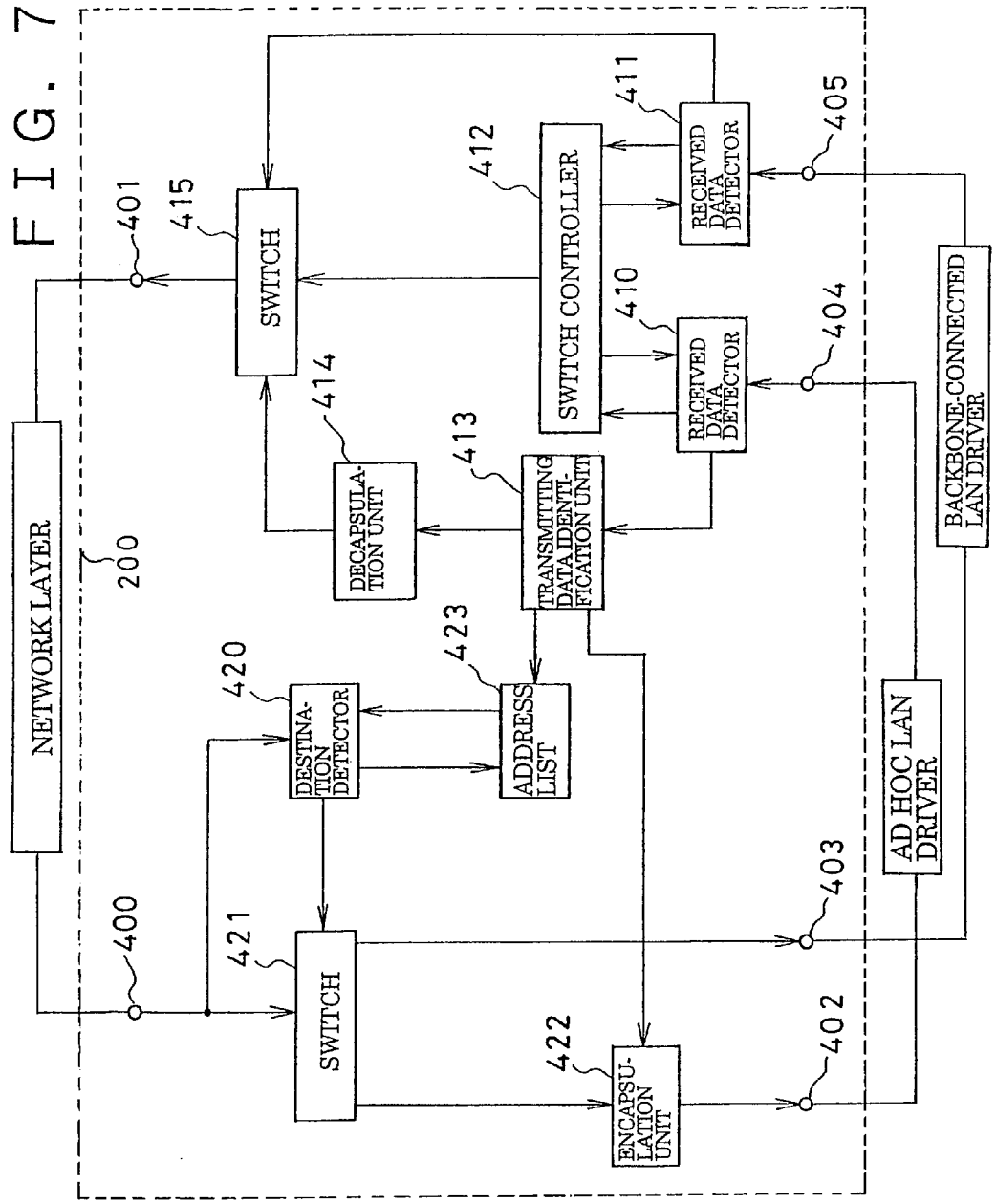
FIG. 7 is a diagram showing the construction of a device driver controller according to the embodiment of the present invention.
Figure 8:
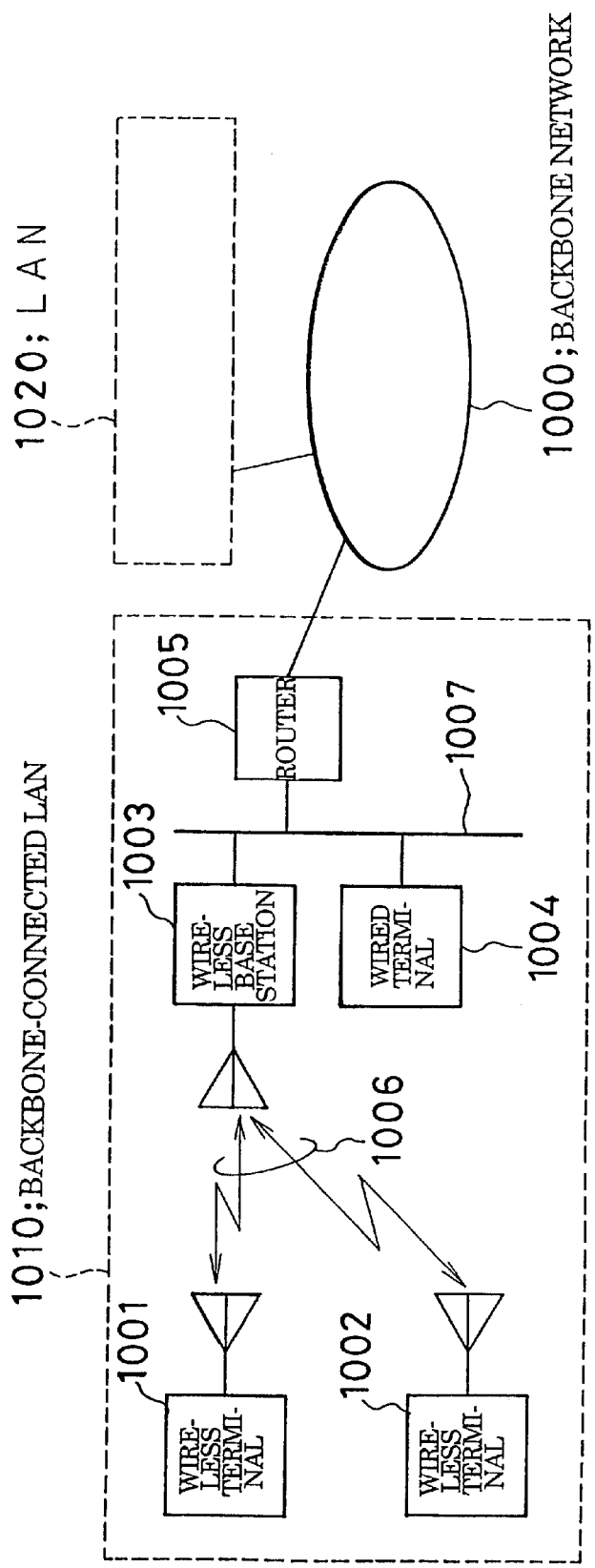
FIG. 8 is a diagram showing the construction of a backbone-connected LAN.
Figure 10:
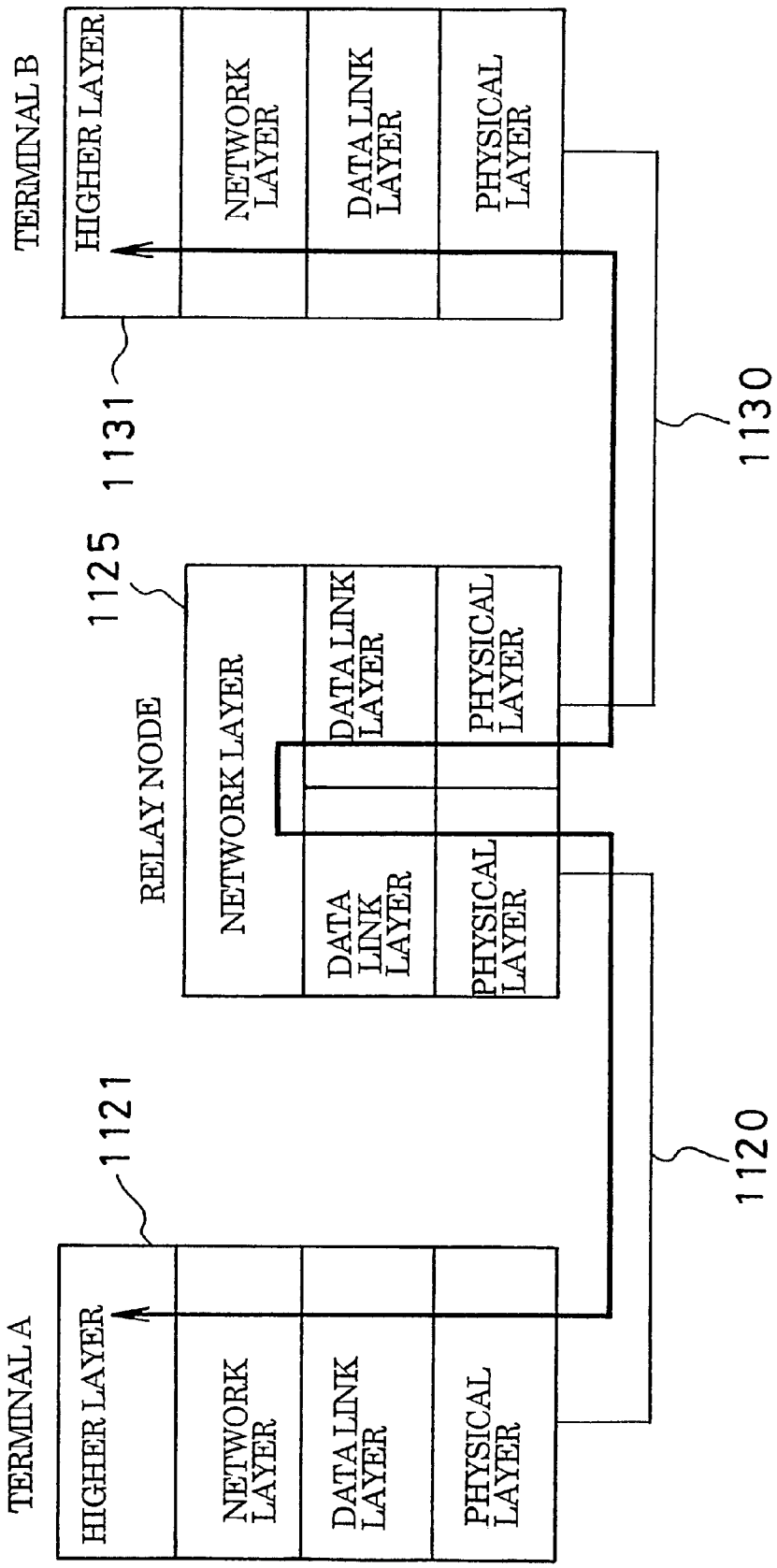
FIG. 10 is a diagram showing an arrangement for connecting LANs by a router.
Figure 11:
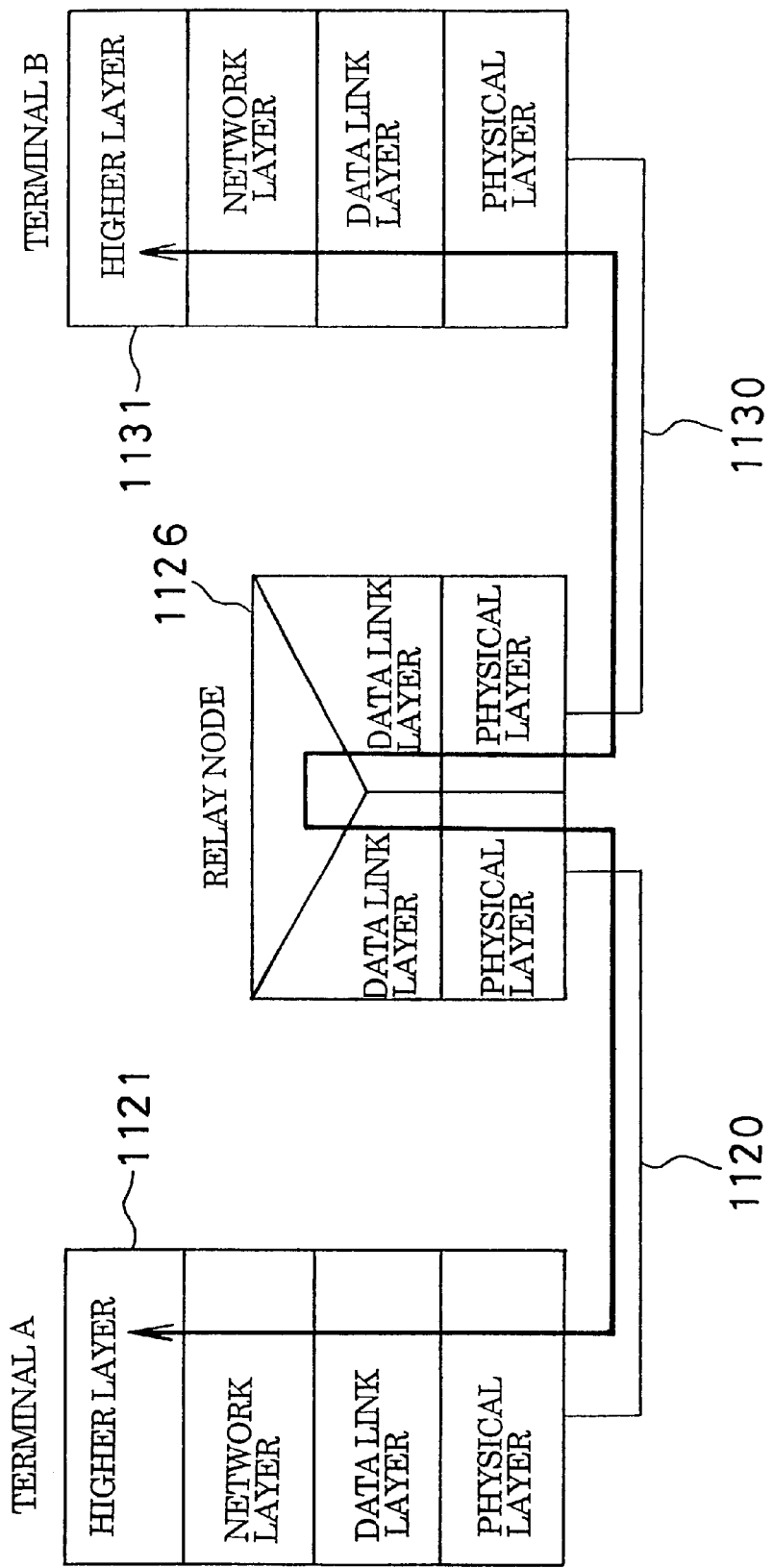
FIG. 11 is a diagram showing an arrangement for connecting LANs by a bridge.
Figure 12:
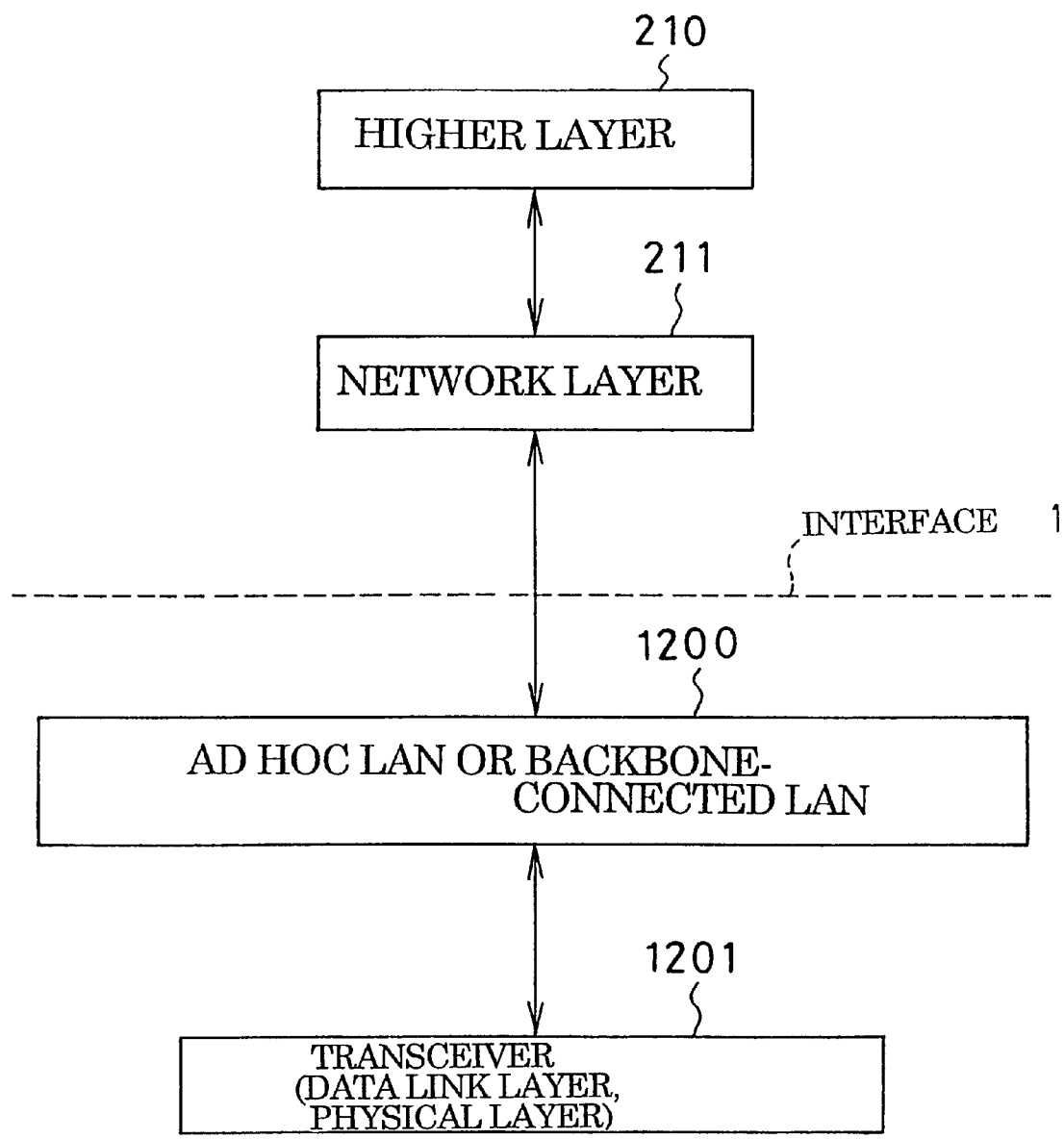
FIG. 12 is a system diagram showing the construction of a terminal according to the prior art.
Figure 13:
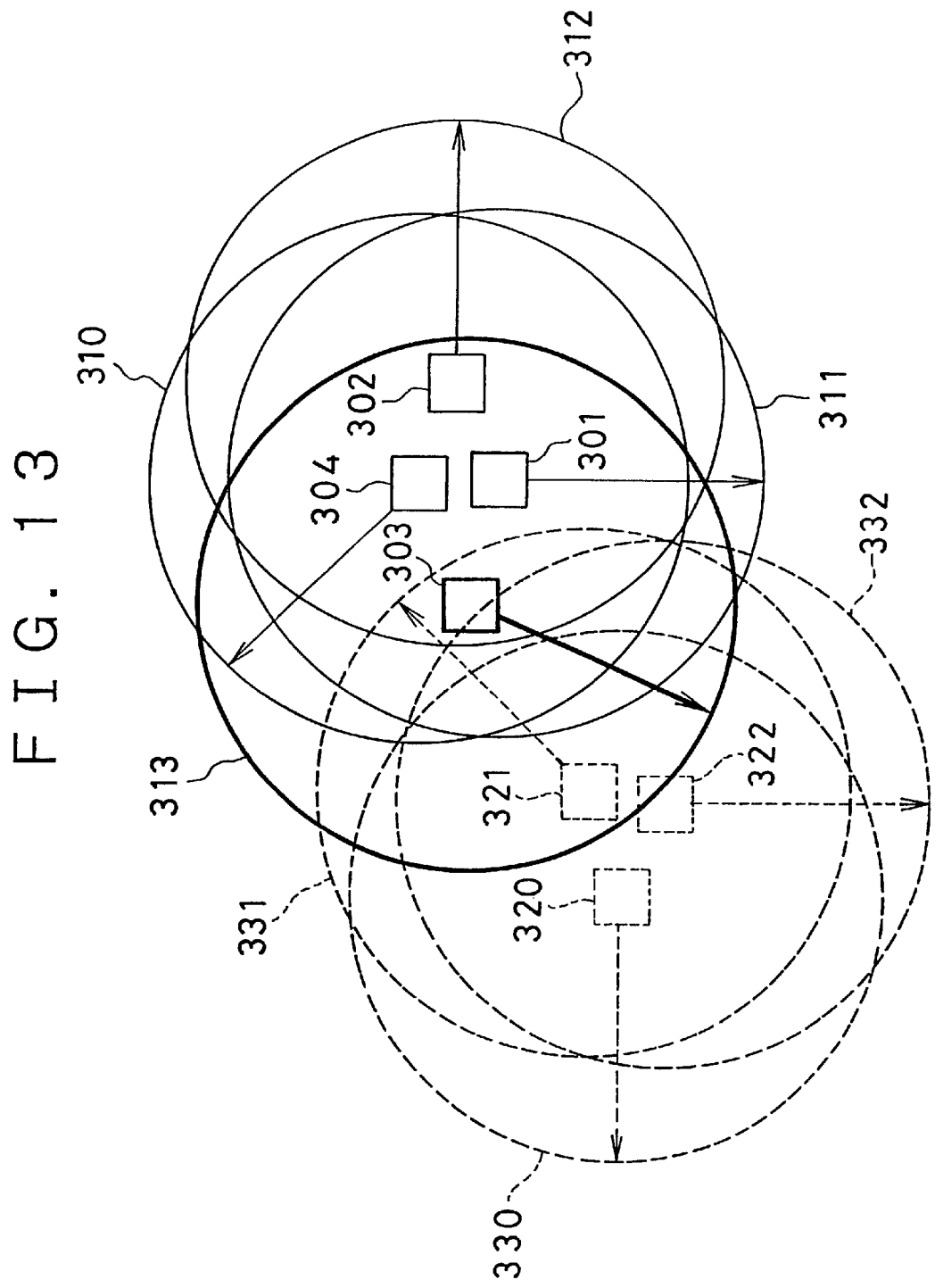
FIG. 13, which is useful in describing the prior art, is a diagram for explaining a multicast communication problem which arises in communication between two ad hoc LANs.

In this embodiment, the device driver controller 200 preferably has the construction shown in FIG. 7. Specifically, the device driver controller has input terminals 400, 404, 405, output terminals 401, 402, 403, received data detectors 410, 411, a switch control unit 412, a received data identification unit 413, decapsulation unit 414, switches 415, 421, a destination detector 420, an encapsulation unit 422 and an address list 423.

As shown in FIG. 2, the device driver controller 200 inputs and outputs signals between the network layer software 211 and the device drivers 223, 221 for the ad hoc LAN and backbone-connected LAN, respectively.

As shown in FIGS. 2 and 7, the network layer software 211 inputs and outputs signals via the input terminal 400 and output terminal 401, the ad hoc LAN device driver 224 via the input terminal 404 and output terminal 402, and the backbone-connected LAN device driver 221 via the input terminal 405 and output terminal 403.

Operation by the device driver controller 200 for receiving data will be described first. When data from the backbone-connected LAN is received in FIG. 7, the received data is entered into the received data detector 411 via the input terminal 405. Data from the ad hoc LAN, on the other hand, enters the received data detector 410 via the input terminal 404.

Upon detecting entry of the received data from the respective input terminals connected thereto, the received data detectors 410, 411 supply the switch control unit 412 with pulses indicating the fact that the received data has been detected. On the basis of the entered detection pulses, the switch control unit 412 controls the switch 415 in such a manner that collision of the received data from input terminal 404 or 405 will not occur at the output terminal 401. In a case where the switch control unit 412 receives the pulses indicative of received data from the data detectors 410, 411 at the same time, the switch control unit 412 transmits a wait pulse to either of the received data detectors.

When the switch control unit 412 controls the switch 415, the switch control unit transmits a pulse, which commands output of the received data, to the received data detector that has output the pulse indicating that received data is present. Upon receiving the pulse from the switch control unit 412 commanding output of the received data, the received data detector 411 outputs the received data. The data is applied to the output terminal 405 via the switch 415.

On the other hand, when a pulse from the switch control unit 412 commanding output of received data enters the received data detector 410, the received data is output to the received data identification unit 413.

The received data identification unit 413 judges whether the received data is control data, such as an ad hoc LAN announcement message in FIG. 4 or address announcement message in FIG. 5, or ordinary user data.

If the received data is an ad hoc LAN announcement message from a connected ad hoc LAN, the received data identification unit 413 extracts the IP multicast address assigned to the ad hoc LAN from the received data and outputs the address to the encapsulation unit 422. If the received data is an address announcement message, then the received data identification unit 413 sends the address list 423 the address that is contained in the message.

If the received data is ordinary user data, then the received data identification unit 413 sends the received data to the decapsulation unit 414. If the received data is the encapsulated packet shown in FIG. 6, the decapsulation unit 414 removes the encapsulation header 351 from the received data and outputs the received data, from which the encapsulation header has been removed, to the output terminal 401 via the switch 415.

By thus constructing the device driver controller 200, received data that is always decapsulated is supplied to the network layer software 211 via the output terminal 401.

Data transmission is performed as follows:

Transmission data from the network layer software 211 is supplied to the device driver controller 200 via the input terminal 400 and enters the switch 421 and destination detector 420.

The destination detector 420 detects the destination of the transmission data, is provided with an input of the address list 423 and determines whether the destination of the transmission data is a terminal within a connected ad hoc LAN or a multicast group.

The destination detector 420 controls the switch 421 to supply the transmission data to the encapsulation unit 422 if the destination is an ad hoc LAN and to the output terminal 403 if the destination is not an ad hoc LAN.

In a case where it is required that the entered transmission data be encapsulated using a header in which the destination is the IP multicast address that has been assigned to a connected ad hoc LAN, the encapsulation unit 422 constructs the encapsulation header 351, adds the header onto the transmission data and then outputs the transmission data to the output terminal 402.

By repeating this operation for transmission data, an ad hoc LAN according to the present invention can be realized without modification of the network layer software 211.

In this embodiment, a case in which a terminal is connected to one ad hoc LAN and one backbone-connected LAN simultaneously is illustrated. However, it should be obvious that the invention can be expanded to cover a case in which a terminal is connected to a plurality of ad hoc LANs and one backbone-connected LAN simultaneously.

As many apparently widely different embodiments of the present invention can be made without departing from the spirit and scope thereof, it is to be understood that the invention is not limited to the specific embodiments thereof except as defined in the appended claims.

What is claimed is:

1. A terminal connectable to a backbone-connected LAN and to an ad hoc LAN simultaneously in an environment
   (a) in which there simultaneously exist a plurality of backbone-connected LANs interconnected by a backbone network via routers and each having a plurality of terminals (referred to as "terminal group 1") connected thereto, and a plurality of ad hoc LANs unconnected to said backbone network and each having a plurality of terminals (referred to as "terminal group 2") connected thereto;
   (b) wherein a plurality of multicast groups, in which all or part of the terminal groups 1 are members, are set up dynamically within a network constituted by said backbone network and said backbone-connected LANs;
   (c) identifiers which identify respective ones of said multicast groups are defined for said multicast groups;
   (d) communication between the members constituting said multicast groups is performed using the identifiers which identify said multicast groups; and
   (e) all or part of the terminal groups 2 are capable of communicating simultaneously not only with terminals connected to said ad hoc LANs to which said terminal groups 2 are connected but also with terminals connected to said backbone-connected LANs;

(f) said terminal being capable of communicating simultaneously not only with terminals connected to said ad hoc LANs but also with terminals connected to said backbone-connected LAN;

(g) said terminal comprising:
- (1) a transceiver for ad hoc LAN purposes for sending signals to and receiving signals from transmission media constituting said ad hoc LANs;
- (2) a transceiver for backbone-connected LAN purposes for sending signals to and receiving signals from transmission media constituting said backbone-connected LANs;
- (3) a device driver for ad hoc LAN purposes corresponding to said transceiver for ad hoc LAN purposes;
- (4) a device driver for backbone-connected LAN purposes corresponding to said transceiver for backbone-connected LAN purposes; and
- (5) a device driver controller for sending signals to and receiving signals from both said device driver for ad hoc LAN purposes and said device driver for backbone-connected LAN purposes via a predetermined interface (referred to as "interface 1"), and sending signals to and receiving signals from network layer software via said interface 1.

2. The terminal according to claim 1, wherein said device driver controller of the terminal connected simultaneously to said backbone-connected LAN and said ad hoc LAN (a) manages an address list which includes other terminals connected to said ad hoc LAN to which said terminal is connected as well as identifiers of existing multicast groups; and (b) in a case where said terminal transmits data, delivers the transmission data to said device driver for ad hoc LAN purposes if a destination address exists in said address list and to said device driver for backbone-connected LAN purposes if the said destination address does not exist in said address list.

3. The terminal according to claim 2, wherein the address list is created as follows:

(a) each terminal connected to said ad hoc LAN periodically transmits an address announcement message to a predetermined destination or destinations, wherein this address announcement message includes the address of said transmitting terminal and the identifier of said participating multicast group within said ad hoc LAN; and (b) at any of terminals which received said address announcement message, the address list is created based upon the address of said transmitting terminal and the identifier of said participating multicast group within said ad hoc LAN, said address and said identifier being included in the address announcement message received by said terminals.

4. The terminal according to claim 3, wherein said device driver controller of the terminal connected simultaneously to said backbone-connected LAN and said ad hoc LAN (a) has said address list;

(b) in a case where said terminal transmits data to a multicast group within said ad hoc LAN, said device driver controller creates an encapsulation header by using an identifier which identifies said ad hoc LAN and the address of said terminal, to add said encapsulation header onto the transmission data, and delivers the transmission data to said device driver; and (c) upon receiving data from a multicast group within said an ad hoc LAN from said device driver, said device controller removes said encapsulation header from the received data and delivers the data to said network layer software of said terminal.

5. A system of ad hoc LAN communication in an environment in which (a) there simultaneously exist a plurality of backbone-connected LANs interconnected by a backbone network via routers and each having a plurality of terminals (referred to as "terminal group 1") connected thereto, and a plurality of ad hoc LANs unconnected to said backbone network and each having a plurality of terminals (referred to as "terminal group 2") connected thereto;

(b) wherein a plurality of multicast groups, in which all or part of the terminal groups 1 are members, are set up dynamically within a network constituted by said backbone network and said backbone-connected LANs;

(c) identifiers which identify respective ones of said multicast groups are defined for said multicast groups;

(d) communication between the members constituting said multicast groups is performed using the identifiers which identify said multicast groups; and (e) it is so arranged that all or part of the terminal groups 2 are capable of communicating simultaneously not only with terminals connected to said ad hoc LANs to which said terminal groups 2 are connected but also with terminals connected to said backbone-connected LANs;

(f) said method comprising the steps of:

(f1) adding a network layer header, which is created based upon a destination address and an address of transmitting terminal, onto transmission data; and (f2) communicating the transmission data, onto which said network layer header has been added, using a packet encapsulated by an encapsulation header created employing the identifier identifying -an ad hoc LAN as a destination and employing the address of the transmitting terminal as the source of transmission.

* * * * *